United States Patent [19]

Cohen

[11] Patent Number: 4,774,977

[45] Date of Patent: Oct. 4, 1988

[54] FULL FLOW MULTIPORT BUTTERFLY VALVE

[75] Inventor: Joseph D. Cohen, Frisco, Tex.

[73] Assignee: Performance Pool Products, Limited, Frisco, Tex.

[21] Appl. No.: 12,880

[22] Filed: Feb. 10, 1987

[51] Int. Cl.[4] .......................................... F16K 11/072
[52] U.S. Cl. .................................... 137/271; 137/595; 137/625.43; 137/625.46; 251/368
[58] Field of Search .................. 137/271, 595, 625.43, 137/625.44, 625.46

[56] References Cited

U.S. PATENT DOCUMENTS

| | | | |
|---|---|---|---|
| 2,351,613 | 7/1942 | Hopkins | 251/301 |
| 2,796,082 | 6/1957 | Green et al. | 137/271 |
| 2,834,368 | 5/1958 | Gray | 137/271 |
| 3,078,070 | 1/1960 | Cooper | 251/68 |
| 3,166,098 | 1/1965 | Jennings | 137/625.43 |
| 3,194,270 | 7/1965 | Viessmann | 137/625.43 |
| 3,228,653 | 1/1966 | Trimmer | 251/625.46 |
| 4,580,603 | 4/1986 | Schoen | 137/625.46 |
| 4,655,252 | 4/1987 | Krumhansl | 137/595 |

FOREIGN PATENT DOCUMENTS

| | | | |
|---|---|---|---|
| 1133194 | 7/1962 | Fed. Rep. of Germany | 137/625.46 |
| 1184575 | 12/1964 | Fed. Rep. of Germany | 137/595 |
| 2808211 | 8/1978 | Fed. Rep. of Germany | 137/625.46 |

Primary Examiner—Robert G. Nilson
Attorney, Agent, or Firm—Hubbard, Thurman, Turner & Tucker

[57] ABSTRACT

A multiport valve with union plumbing connections utilizing a disc diverter of diameter larger than the valve's flow port diameter permanently housed in a spherical two piece welded housing that yields a nonserviceable but easily replaced multiport valve with low resistance. With removable plugs having surfaces shaped to correspond with the interior of the valve, the valve configuration can be changed from four ports to three or two ports at any time. Two external valve coupling flanges located normal to the ports together with clamps and a drop through actuator shaft allow multiple valve operation by a common shaft. An offset indexing spline located in the disc diverter's actuator shaft hole together with an ivertable valve body design allow relative positioning of valve diverters to be either parallel or perpendicular in multiple valves/common shaft configurations. The combination of this valve's features facilitates welding valve housing halves together to provide a versatile multiport valve system with easily replaced components.

12 Claims, 4 Drawing Sheets

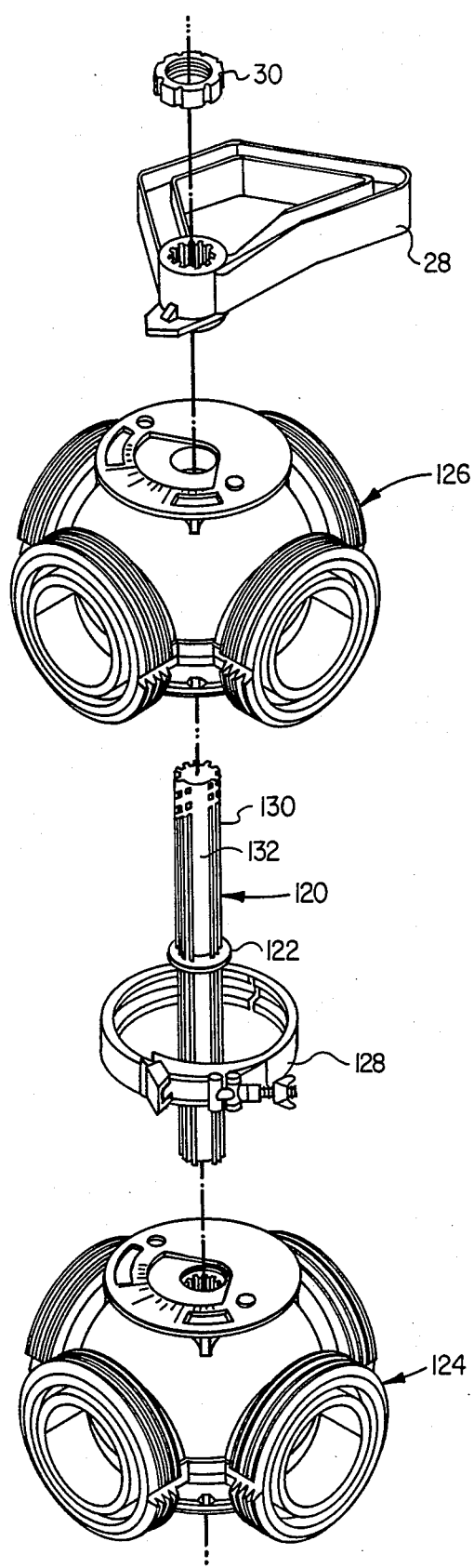
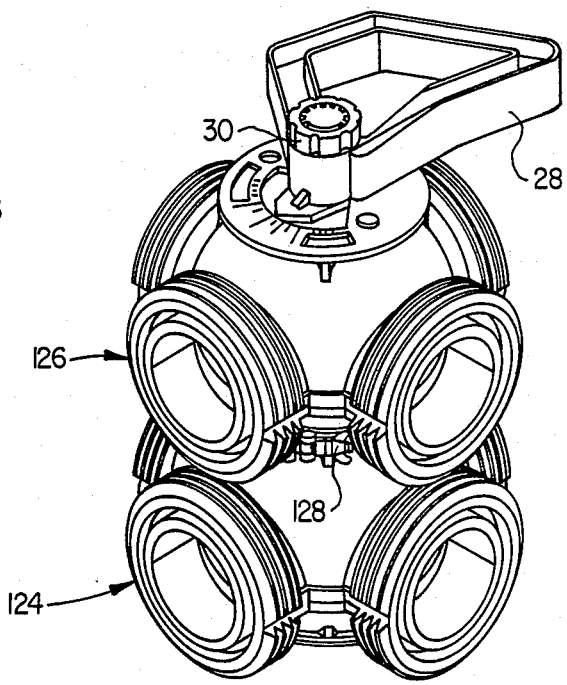
FIG. 4
FIG. 5

FULL FLOW MULTIPORT BUTTERFLY VALVE

This invention relates to valves and more particular to a full flow multiport valve.

BACKGROUND OF THE INVENTION

A multiport butterfly valve device is known which includes a vertically split body structure. A gasket type seal is between the two halves of the valve body together with an elliptical vane. The vane is rotatable 360 degrees and its peripheral edge continuously contacts the gasket while sliding through the gasket port for sealing against flow. Those persons skilled in the art desiring further information for this valve are referred to U.S. Pat. No. 3,228,653 issued Jan. 11, 1966.

In another known multiport shutoff valve, the movable flap member is rotated in a valve housing having concentric, spherically-shaped sealing surface zones which cooperate with an edge of the flap member for sealing off the flow of liquid from a coupling perpendicular to one of two coaxially aligned couplings. This valve is the subject of U.S. Pat. No. 4,580,603 issued Apr. 8, 1986. A three-way valve structure is also disclosed in U.S. Pat. No. 2,351,613 issued June 20, 1944. The structure differs in that the butterfly vane is pivotally connected with respect to the two coaxially aligned ports and the perpendicular port and has a length sufficient for its ends to engage opposite sides of the perpendicular port when pivoted for selectively coupling fluid flow from the coaxially aligned ports to the perpendicularly disposed port. Another three-way valve is disclosed in U.S. Pat. No. 3,078,070.

The essential differences between the present invention and the known prior art is the provision of a spherically shaped valve housing having four orthogonally disposed ports with sealing areas disposed between adjacent ports. Thus, two opposite sealing areas are formed between two sets of adjacent ports for a valve flap or a disc having a diameter substantially larger than the interior diameter of the ports. With a 90 degree stroke the disc rotates from two opposite sealing areas between the two sets of adjacent ports to the two remaining sealing areas. The four ports may be attached to piping, or any of them may be plugged, depending on the application.

In addition, a plurality of four port valves may be stacked using a single, splined valve actuator shaft. The additional valves may be mounted on the shaft inverted producing opposite diverter positioning. Thus, inverted stacked four port valves have opposite fluid flow directions to noninverted stacked valves.

The design features of the present valve invention provide a valve suitable for effectively handling large volumes of slurry liquids without malfunction or breakdown and without appreciable line pressure loss.

SUMMARY OF THE INVENTION

Accordingly it is an object of the invention to provide a modular multiport valve system that can be stacked and interconnected to reduce multiple valve functions required for such systems as swimming pool, water treatment, paper manufacturing, food processing and the like to singular failsafe valve functions.

Another object of this invention is to provide a valve system which is simple to install and maintain.

A further object of the invention is to provide a full flow multiport valve which is simple in design and provides a greater economy of manufacture than the multiport value designs presently manufactured.

Another object of this invention is to reduce the valve's possibility of external leakage by utilizing a one piece welded body.

Still another object of the invention is to provide an easy to replace non-serviceable valve.

Briefly stated the invention comprises a disposable, non-serviceable four port valve for a modular valve system. All plumbing connections are unions, so a malfunctioning valve can be replaced without cutting piping. The valve ports may be either piped or plugged allowing the valve to function as a two, three, or four port valve. When used in the plugged mode, the plugged ports double in function as system drain ports. A spherical housing provides dimensional stability and has actuator shaft access holes at both ends of the diverter (flap) axis. The diverter axis is perpendicular to the plane defined by the centers of the four ports, and bisects this plane at the center of the spherical housing. An actuator shaft is installed through the bottom of the diverter and has a shoulder which abuts the bottom of the diverter. A handle is attached to the shaft at the top of the diverter using a tightening nut. A pair of external stops are provided adjacent to the handle to stop the handle movement when the diverter is dead center of the sealing area. Thus, except for the dynamic seals and stops, none of the dynamic parts touch the valve housing.

BRIEF DESCRIPTION OF THE DRAWINGS

Other objects and features of the invention will become more readily apparent from the following detailed description when read in conjunction with the accompanying drawings in which:

FIG. 4 is an exploded view of a stacked multiple valve arrangement of the invention; and FIG. 5 is an isometric view of stacked multiple valve arrangement of the invention.

DETAILED DESCRIPTION OF THE PREFERRED EMBODIMENT

Figure 1:
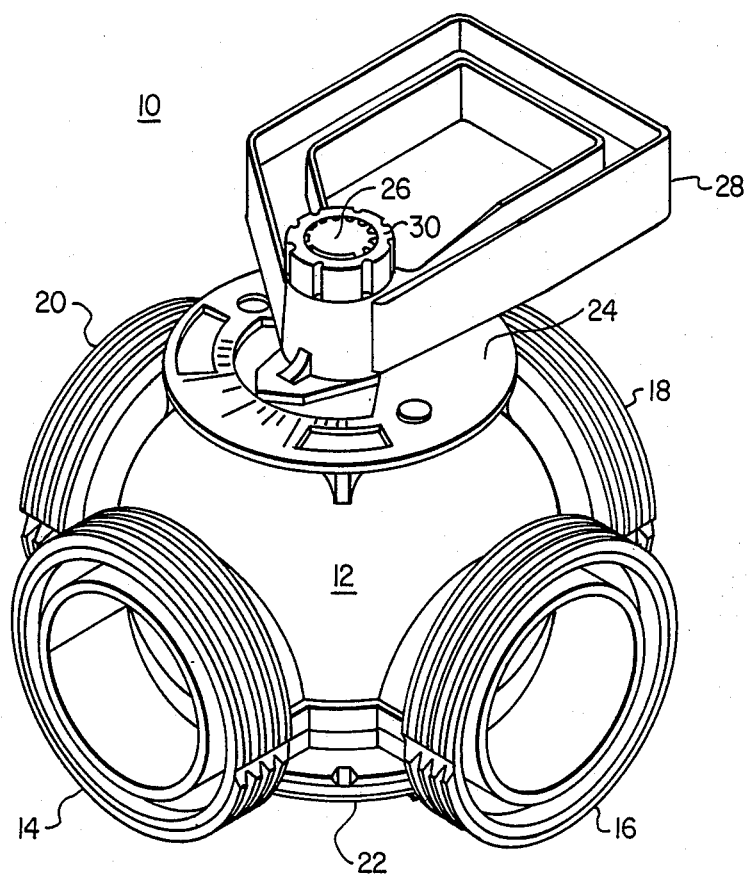
FIG. 1 is an isometric view of the multiport valve constituting the subject matter of the invention.

Referring now to FIG. 1, the multiport valve 10 includes an internally spherical housing 12 having four union ports 14, 16, 18 and 20, opposing top and bottom valve coupling flanges 22 and 24, diverter actuator shaft 26, handle 28, and handle tightening nut 30.

Figure 2:
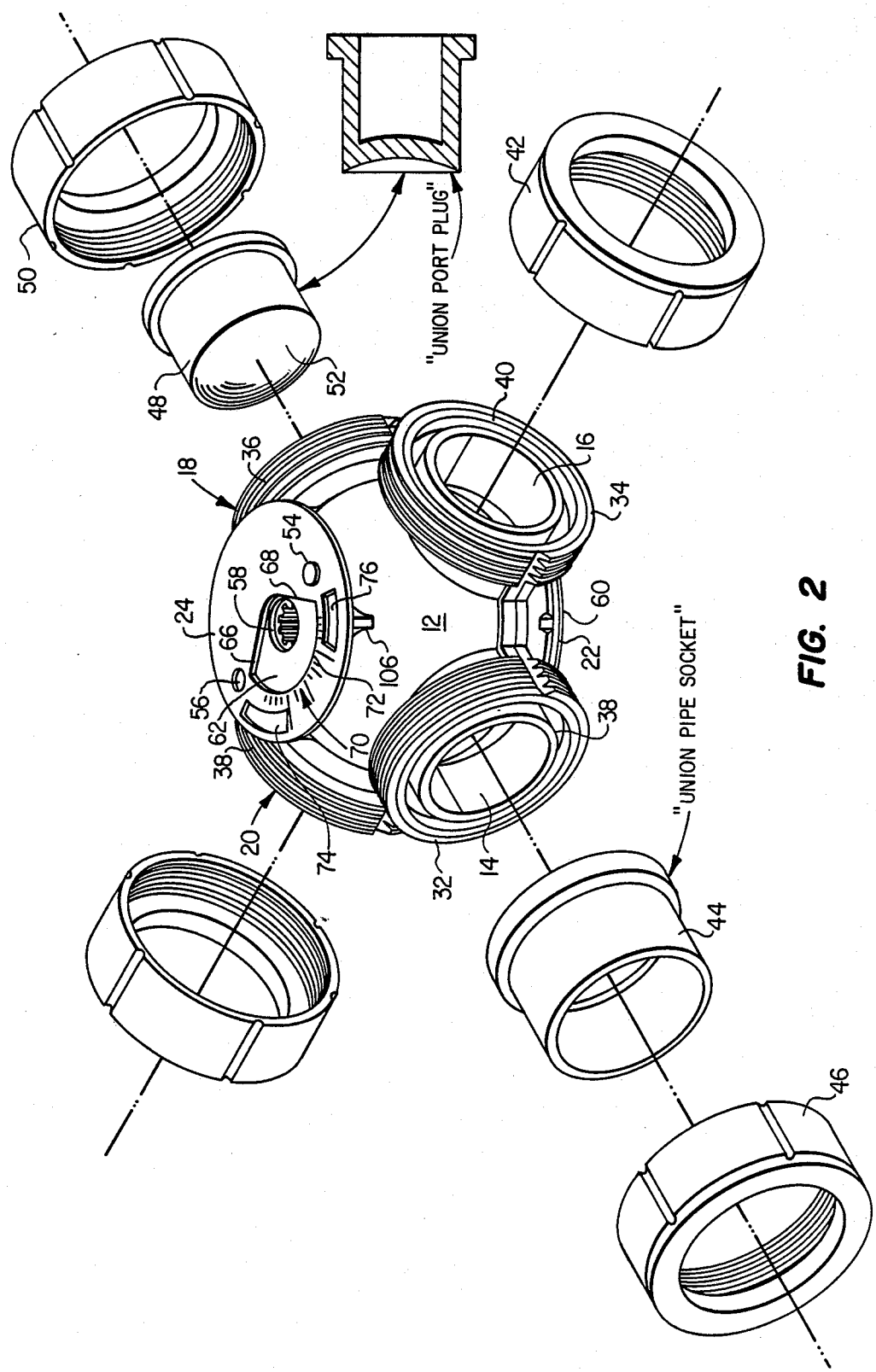
FIG. 2 is an isometric view of the multiport valve with the handle and shaft removed to show the structure of the top flange and piping and plug connectors.

The union ports 14, 16, 18 and 20 (FIG. 2) include exteriorily threaded flanges 32, 34, 36, and 38 having "O" ring glands formed in the faces thereof. Only glands 38 and 40 of the four "O" ring glands are visible.

To connect piping of the same or different size a union pipe socket 44 is welded to the pipe and inserted onto the port flange 32 and retained in sealing engagement with the "O" rings in "O" ring gland 38 by the compression nut 46.

Any port such as port 18, if desired, can be plugged using a flanged plug 48 inserted in the port with the flange thereof being retained in sealing engagement with an "O" ring by compression nut 50. The interior end surface 52 of the plug is shaped concave to complete the interior surface of the spherical housing 12.

Figure 3:
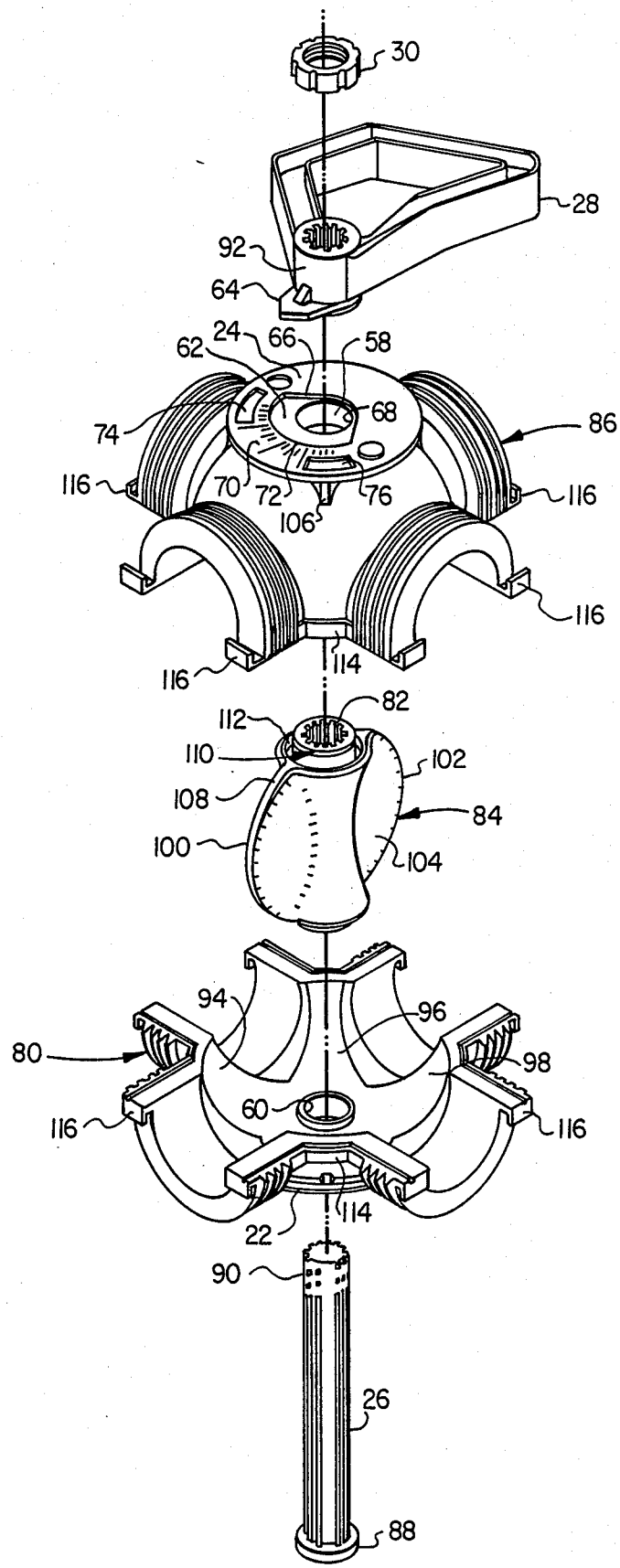
FIG. 3 is an exploded view of the multiport valve showing the valve housing in pre-welded halves.

The top valve coupling flange 24 (FIG. 2) includes an indexing pin 54 and aperture 56 arranged 180° apart for receiving the corresponding indexing hole and pin of a valve coupling flange 22 of a second multiport valve. The top and bottom flanges 22 and 24 have diverter shaft access aperture forming walls 58 and 60 (FIG. 3). A recessed area 62 is formed in the upper surface of the top flange about the diverter shaft access aperture. The recessed area is sufficient to receive a diverter position indicator 64 of the handle 28. The edges 66 and 68 (FIG. 2) of the recess 62 form external handle stops which define precisely a ninety degree diverter stroke. The external limiting stops stop the handle movement when the diverter position indicator meets the stops. At these stops the diverter is dead center of the housing internal sealing area, hereinafter described.

Recessed markings 70 are formed in the top flange adjacent to the curved edge 72 of the recessed area 62 for indicating the current position of the diverter. These reference marks reference off a point on the valve handle hub and are recessed so as not to interfere with coupling two flanges together. Two recessed areas 74 and 76 are formed in the flange at the end of the stroke references for labels which identify the operation of the valve at these points.

The diverter access apertures of the valve coupling flanges forming walls 58 and 60 are for receiving the splined diverter actuator shaft 26 (FIG. 3). The actuator shaft 26 is installed through the aperture of the bottom valve coupling flange forming walls 60 of the bottom flange 22 of the lower valve body half 80, a correspondingly splined tubular portion 82 of the diverter 84, and the aperture of the top valve coupling flange forming walls 58 of the top valve coupling flange 24 of the upper body half 86. The actuator shaft 26 has a shoulder 88 and a threaded portion 90. The threaded portion 90 extends above the top flange 24 through a splined hub 92 of handle 28. The handle is retained on the shaft 26 by the tightening nut 30 which forces the handle against the top of the diverter 84, and the shoulder 88 against the diverter 84. Thus, a floating diverter is provided for the valve.

The interior of the spherical body 12 halves 80 and 86 have dynamic diverter sealing areas between the ports. Only three of the four dynamic diverter sealing areas 94, 96 and 98 can be seen and they are visible in the lower half of the body. The diverter sealing areas form part of a sphere having a diameter substantially greater than the inside diameters of the four ports. The diverter sealing areas coact with the sealing edges 100 and 102 of disc 104 of the diverter 84 only at the ends of the ninety degree stroke of the diverter. Thus, the valve squeezes its entire dynamic seal only at the ends of the diverter stroke.

As the diverter 84 (FIG. 3) is larger than the port openings of the valve, the spherical body 12 must be built around the diverter 84. Thus, the body is molded in the two halves 80 and 86 and welded around the diverter 84. The valve body halves are preferably of castor oil based nylon 11 or 12 manufactured by Atochem Canada and sold by Atochem, Inc. under the trademarks PEBAX and RILSAN. material, because nylon is a plastic with great strength and resiliance, has a low coefficient of friction desirable for smooth diverter operation, has a low moisture absorption factor for dimensional stability, and is rated as excellent for vibration welding.

Both valve body halves 80 and 86 are produced by one mold, to produce a perfectly matched set. The lettering, label areas, and index marks on the coupling flange 24 are recessed, so as not to interfere with the coupling of valves together. The recessed limiting stops 66 and 68 (FIG. 2) and the words "Port 1", "Port 2", "Port 3", and "Port 4" are created by removable mold inserts. The top half is molded with these inserts; the bottom half without. Four ribs 106 between the sphere of the valve body 12 and the coupling flanges provide added support. The ribs have a fair amount of draft (about 10 degrees) and directly align with the four inner sealing areas located between ports. The bottom of the coupling flange and the four support ribs are molded by two cam operated slides, which draw out of the mold on a line between the diverter axis and the center of the inner sealing area. The wide "acme" threads on the four union port flanges are formed by adjustable mold inserts. When molding valve body bottom halves, these inserts are moved inward toward the diverter axis the distance of ½ of one thread to allow for thread alignment on the completed flange. The start thread occurs on the top body half.

The diverter 84 (FIG.3) is also fabricated by nylon 11 or 12 material to insure consistent expansion and contraction with the valve body caused by moisture absorbtion and temperature change.

The diverter 84 is molded of two similar nylons with different durometers. Initially the diverter is molded with a recessed grove at the sealing edge areas 100 and 102. A rigid nylon is used for the first molding. The diverter is then placed in a second mold and the flexible dynamic seal 108 is molded to it. A teflon impregnated nylon of low durometer (about shore 50) is used for this process, to allow for proper dynamic seal squeeze and actuation. The dynamic seal fuses to the diverter edge.

The first mold parts on a plane containing the diverter axis and is perpendicular to the plane the edge of the diverter lies in. The splined shaft aperture and end cavities 112 are formed by two cam operated slides. Draft in the splined shaft hole is two degrees with the lowest diameter of the hold at the center of the diverter. Two "O" ring glands 110 are later machined in after molding is completed.

The second mold forms the dynamic seal around the diverter. This mold parts on a plane perpendicular to the plane the diverter edge lies in and is perpendicular to the diverter axis.

The handle 28 (FIG. 3) is a rotary stirrup handle to allow the operator to use both hands to provide the torque necessary to actuate one or more valves at a time. It is "dog legged" to allow safe hand clearance between the handle and valve. The collar or hub 92 of the handle is ribbed both to the stirrup and indicator point 64 for added strength. The indicator point is molded by an automatic mold slide.

After all the components are molded and deflashed, the diverter two "O" ring end glands are machined, and "O" rings installed. A small amount of silicone grease is applied to the "O" rings and to the diverter seal to prevent damage during valve body welding.

Then, the bottom body half is positioned in the vibration welding fixture. This fixture has provisions for the coupling flanges index pin and hole so that the valve is properly positioned to weld. Also this fixture fits into the permanent welding fixture flanges 114 located externally on the valve body between adjacent union port flanges and into the removable welding fixture flanges located on the union port flange faces 116. The greased diverter is positioned mid-port on the splined shaft located in the bottom fixture. The plane the diverter edge lies in contains the line of stroke of the vibration weld. The top body half 86 is next positioned and the two halves are welded by a vibration stroke of about 0.050" at 240 cycles per second, stopping at +0.005" of center.

After welding, the four union port flange faces are machined to remove the welding fixture flanges 116 and the four "O" ring glands (38 and 40) machined in.

Next, the inside of the valve at the weld area is deflashed using an ultrasonic scalpel. The scalpel is automatically indexed to accurately follow the port, ramp, and seal areas, removing the weld flash in the process.

Finally, the valve is fitted with the handle.

For multivalve connections a longer diverter actuator shaft 120 with an intermediate shoulder 122 (FIG. 4) is used to accomodate the clamping together of two or more valves 124 and 126 at their abutting coupling flanges by a clamp 128. The valves may be clamped bottom to top, top to top, or bottom to bottom. The clamp 128 is preferably a stainless steel V-clamp which provides for quick release.

The actuator shaft includes a plurality of splines 130 and a wide indexing keyway 132. The wider indexing keyway 132 in the diverter actuator shaft is offset forty-five degrees in relation to the edge of the diverter. Thus, the installation of an added valve upside down provides a valve with a diverter positioned perpendicular to the diverter in the top valve. If an added valve is installed upside down, ports two and four become the ideal common ports and port one still aligns with port one in the top valve. After the valves are selectively positioned on the shaft, the handle 28 is positioned on the shaft and the tightening nut 30 used to secure the handle on the shaft. It will be appreciated that the ports of the combined valves can be interconnected as desired, for example, port 2 of valve 1 can be connected to port 2 of valve 2.

From the above, those persons skilled in the art will quickly recognize that the valves may be combined to reduce schematically complex multiple valving functions to singular failsafe valve operations, to simplify system valve operation by actuating multiple valve functions in harmony, and to save space and installation costs.

Although several embodiments of the invention have been shown and described it will be readily apparent to those skilled in the art that modification and changes to the structures thereof can be made without departing from the scope of the invention.

What is claimed is:

1. A valve comprising:
   a spherical body having walls forming a plurality of equally spaced ports and first and second apertured coupling flanges normal to the plurality of ports; the spherical body portions surrounding the plurality of ports forming internal diverter sealing surfaces;
   a diverter means including a disc diverter and a diverter actuator shaft, said disc diverter having edges for sealingly engaging the sealing surfaces of the spherical body for diverting fluid flow through selected ports; and an internally splined hub, said diverter actuator shaft having a splined surface corresponding to the internally splined hub of the disc diverter, a shoulder, and a threaded end, the diverter actuator shaft being inserted through the first apertured flange, through the splined hub of the disc diverter, and through the aperture of the second flange with the shoulder engaging a first end of the disc diverter hub and the splines; and
   a handle means including an internally splined hub mounted on the splined surface of the diverter actuator shaft and a tightening nut threadedly mounted on the threaded end of the diverter actuator shaft for securing the diverter on the diverter actuator shaft between the inverter shaft shoulder and handle for rotation wherein said diverter floats for rotation within the center of the spherical body of the valve regardless of the internal/external pressure differential, and wherein said first and second apertured flanges are adapted for coupling to an additional valve similarly constructed.

2. The valve as claimed in claim 1 wherein the second apertured flange includes a recessed area having spaced edge forming stops and the handle has a diverter position indicator mounted in the recessed area for engaging the stops for stopping the handle and its corresponding diverter at the end of the diverter stroke whereby the diverter at the ends of the stroke is substantially centered with respect to the internal sealing surface of the spherical body.

3. The valve as claimed in claim 1 wherein the diverter actuator shaft has a preselected length for receiving the diverters of a plurality of similarly constructed valves and splines having a first width and a keyway having a second width, the keyway having the second width being of larger width than the splines of the first width and having a preselected offset in relation to the edge of the disc diverter wherein the installation of an additional valve inverted produces a valve having its disc diverter positioned angularly with respect to the disc diverter in a noninverted valve attached to the same diverter actuator shaft, whereby valves can be provided having preselected interconnect hydraulic positions for a substantial number of different hydraulic systems.

4. The valve as claimed in claim 1 further including a plug connector means having a plugging member and plug retention member, the plugging member adapted for insertion into a valve port and having a surface complementary to the internal spherical surface of the valve body.

5. A valve which comprises:
   a valve body having a spherical internal sealing surface and at least three flow ports, wherein said valve body includes diametrically spaced apart actuator shaft access holes, each of said access holes having positioned thereabout an outwardly extending coupling flange, and wherein each of said coupling flanges includes locator means for aligning multiple valves, and a diverter disc rotatably mounted in said valve body, said diverter disc having a circular seal engageable with said sealing surface to selectively communicate and isolate various of said flow ports with and from each other.

6. The valve as claimed in claim 5, wherein said locator means includes an index pin and an index hole positioned on said coupling flange spaced apart from each other on opposite sides of said access hole.

7. A valve which comprises:
   a valve body having a spherical internal sealing surface and at least three flow ports, wherein said valve body includes diametrically spaced apart actuator shaft access holes, each of said access holes having positioned thereabout an outwardly extending coupling flange;

a diverter disc rotatably mounted in said valve body, said diverter disc having a circular seal engageable with said sealing surface to selectively communicate and isolate various of said flow ports with and from each other;

an actuator shaft connected to said diverter disc and extending outwardly of said access holes; said actuator shaft being at least twice as long as the diameter of said diverter disc and including a radially outwardly extending shoulder positioned intermediate the ends of said actuator shaft nearer to the end of said actuator shaft that is rotated during operation of the valve whereby multiple diverter discs may be operated by said actuator shaft.

8. A valve which comprises:

a valve body having a spherical internal sealing surface and at least three flow ports, said valve body including diametrically spaced apart actuator shaft access holes, each of said access holes having positioned thereabout an outwardly extending coupling flange;

a diverter disc rotatably mounted in said valve body, said diverter disc having a circular seal engageable with said sealing surface to selectively communicate and isolate various of said flow ports with and from each other; and an actuator shaft connected to said diverter disc and extending outwardly of said access holes, said actuator shaft including a keyway and said diverter disc including a key engageable with said keyway, said key being positioned at a 45 degree angle with respect to the plane of said diverter disc.

9. A valve which comprises:

a valve body having a spherical internal sealing surface and at least three flow ports; and a diverter disc rotatable mounted in said valve body, said diverter disc having a circular seal engageable with said sealing surface to selectively communicate and isolate various of said flow ports with and from each other, wherein said valve body includes internal relieved areas around said flow ports which do not engage said diverter disc seal and wherein said relieved areas include tapered areas between said flow port and said spherical sealing surface to provide progressive compression of said diverter disc seal as it moves into engagement with said sealing surface.

10. A valve comprising:

first and second body halves for welding together to form a spherical internal sealing surface having at least three flow ports; and a diverter disc, and a seal mounted upon the periphery of the diverter disc, said diverter disc being rotatably mounted within the first and second body halves for positioning the seal away from the weld area during welding of the first and second body halves together and for positioning the seal thereafter for engagement with the internal sealing surfaces to selectively communicate and isolate various of said flow ports with and from each other during valve operation.

11. A valve according to claim 10 further including a flow port plug for insertion into one of said flow ports wherein said port plug includes a concave inner end positionable to complement the internal spherical surface of said valve body for the purpose of changing the number of valve flow ports.

12. A valve comprising:

a valve body having a spherical internal sealing surface and at least three flow ports, said valve body including diametrically spaced apart actuator shaft access holes, each of said access holes having positioned thereabout an outwardly extending coupling flange;

a diverter disc rotatably mounted in said valve body, said diverter disc having a circular seal engageable with said sealing surface to selectively communicate and isolate various of said flow ports with and from each other; and an actuator shaft nonrotatably connected to said diverter disc and extending outwardly of said access holes, said actuator shaft and said diverter disc having an indexing means including a key member and a keyway member being positioned angularly with respect to the plane of said diverter disc wherein the installation of an additional valve inverted produces a valve having its disc diverter positioned angularly with respect to the disc diverter in a noninverted valve attached to the same diverter actuator shaft, whereby valves can be provided having preselected interconnect hydraulic positions for a substantial number of different hydraulic systems.

* * * * *